United States Patent
Yamashita

(10) Patent No.: US 8,610,782 B2
(45) Date of Patent: Dec. 17, 2013

(54) BROADCAST RECEIVING DEVICE

(75) Inventor: Hiroshi Yamashita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1440 days.

(21) Appl. No.: 12/051,546

(22) Filed: Mar. 19, 2008

(65) Prior Publication Data

US 2008/0239165 A1    Oct. 2, 2008

(30) Foreign Application Priority Data

Mar. 26, 2007   (JP) .................................. 2007-078182

(51) Int. Cl.
- H04N 17/02 (2006.01)
- H04N 17/00 (2006.01)
- H04N 5/00 (2011.01)
- H04N 5/52 (2006.01)

(52) U.S. Cl.
USPC ............ 348/194; 348/189; 348/607; 348/687

(58) Field of Classification Search
None
See application file for complete search history.

(56) References Cited

U.S. PATENT DOCUMENTS

| 5,045,926 A * | 9/1991 | Amano et al. ................ 348/627 |
| 5,161,019 A * | 11/1992 | Emanuel ......................... 725/56 |
| 7,471,340 B1 * | 12/2008 | Chowdhury et al. ......... 348/572 |
| 2004/0080675 A1 * | 4/2004 | Hoshino ....................... 348/731 |

FOREIGN PATENT DOCUMENTS

| JP | 2004-341481 A | 12/2004 |
| JP | 2006-133405 A | 5/2006 |

OTHER PUBLICATIONS

"An Introduction to Signals, Signal Parameters & Measuring Signals", as published on Dec. 7, 2006 by Bucknell.edu, which was obtained from Internet Archives: Web.archive.org.*

* cited by examiner

*Primary Examiner* — Jason J Chung
*Assistant Examiner* — James R Marandi
(74) *Attorney, Agent, or Firm* — Global IP Counselors

(57) ABSTRACT

A broadcast receiving device includes a receiving component, a comparison component and a drive signal generating component. The receiving component is configured to receive broadcast waves and extract a video signal from the broadcast waves. The comparison component is configured to compare quality of the video signal with a first level. The drive signal generating component is configured to generate a drive signal for displaying video on a display based on the video signal such that at least one of brightness and contrast of the video is reduced by a certain amount when the quality of the video signal is lower than the first level.

7 Claims, 2 Drawing Sheets

BROADCAST RECEIVING DEVICE

CROSS-REFERENCE TO RELATED APPLICATIONS

This application claims priority to Japanese Patent Application No. 2007-078182 filed on Mar. 26, 2007. The entire disclosure of Japanese Patent Application No. 2007-078182 is hereby incorporated herein by reference.

BACKGROUND OF THE INVENTION

1. Field of the Invention

The present invention generally relates to a broadcast receiving device. More specifically, the present invention relates to a broadcast receiving device that receives broadcast waves.

2. Background Information

Conventional broadcast receiving devices receive broadcast waves transmitted from broadcast stations. The broadcast receiving devices output video and audio based on the received broadcast wave. The broadcast receiving devices output video properly when the broadcast wave is received properly. However, if the broadcast wave deteriorates for one reason or another, then snow noise is displayed on a display, for example. Specifically, the snow noise is generated since a video signal included in the broadcast wave deteriorates during wireless transmission of the video signal.

When a video image is distorted by the snow noise or the like, current fluctuations and so forth become more severe at a driver displaying the video signal on the display. The current fluctuations increase a radiation of electromagnetic waves. The radiation of the electromagnetic waves becomes noise to other devices. Thus, if the snow noise level is high, then there is a risk of not being able to pass the standard related to FCC (Federal Communications Commission) class noise restriction, for example.

With the conventional broadcast receiving devices, when the received video signal deteriorates considerably and a certain amount of the snow noise is generated, the video signal is halted to be displayed and a blue background is displayed (see Japanese Laid-Open Patent Application Publication No. 2006-133405 or Japanese Laid-Open Patent Application Publication No. 2004-341481, for example). This reduces the amount of radiation of the electromagnetic waves accompanying the generation of the snow noise.

However, with the conventional broadcast receiving devices, it is difficult to suitably deal with situations when a certain amount of the snow noise is generated but the video can be displayed to the extent that it is possible to view contents of the video. Specifically, if noise suppression is given priority and the blue background is displayed, then the viewer cannot see the contents of the video at all. On the other hand, if nothing at all is done to suppress noise, then the problem is that the noise can affect other devices.

In view of the above, it will be apparent to those skilled in the art from this disclosure that there exists a need for an improved broadcast receiving device. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a broadcast receiving device with which even if a video signal deteriorates somewhat, a video based on the video signal is still displayed while a generation of noise is reduced.

In accordance with one aspect of the present invention, a broadcast receiving device includes a receiving component, a comparison component and a drive signal generating component. The receiving component is configured to receive broadcast waves and extract a video signal from the broadcast waves. The comparison component is configured to compare quality of the video signal with a first level. The drive signal generating component is configured to generate a drive signal for displaying video on a display based on the video signal such that at least one of brightness and contrast of the video is reduced by a certain amount when the quality of the video signal is lower than the first level.

With the broadcast receiving device of the present invention, it is possible to provide a broadcast receiving device with which even if a video signal deteriorates somewhat, a video based on the video signal is still displayed while a generation of noise is reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
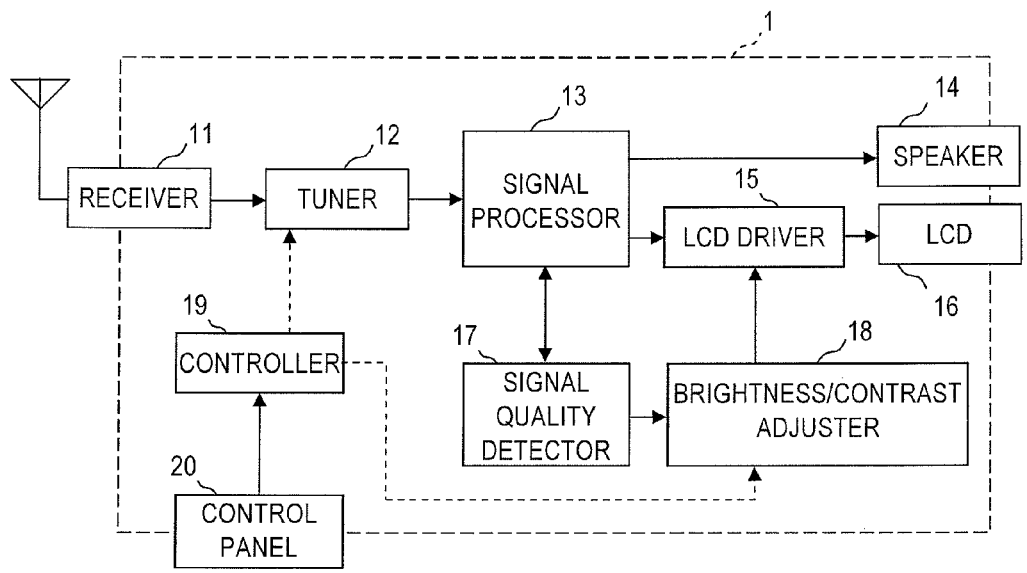
FIG. 1 is a diagram illustrating a broadcast receiving device in accordance with one embodiment of the present invention.

As shown in FIG. 1, a broadcast receiving device 1 includes a receiver (e.g., receiving component) 11, a tuner (e.g., receiving component) 12, a signal processor 13, a speaker 14, an LCD (liquid crystal display) driver (e.g., drive signal generating component) 15, an LCD 16, a signal quality detector (e.g., comparison component) 17, a brightness/contrast adjuster (e.g., comparison component) 18, a controller 19, a control panel 20, and so forth.

The receiver 11 has an antenna or the like. The receiver 11 receives broadcast waves including video and audio information. The receiver 11 transmits the broadcast waves to the tuner 12.

The tuner 12 extracts (tunes in) a signal of a specific frequency (channel) from the received broadcast waves that has been transmitted from the receiver 11. The tuner 12 transmits the signal as a broadcast signal to the signal processor 13. The user uses the control panel 20 to select the channel to be tuned in.

The signal processor 13 performs specific processing, such as extracting video signals and audio signals, on the broadcast signal that have undergone tuning. The speaker 14 outputs audio based on the audio signals transmitted from the signal processor 13.

The LCD driver 15 generates a drive signal for displaying video on the LCD 16 based on the video signals transmitted from the signal processor 13. The LCD driver 15 outputs the drive signal to the LCD 16. The transmission of drive signals between the two devices is accomplished by the LVDS (low voltage differential signaling) method. The LCD driver 15 generates the drive signal such that at least one of brightness and contrast of the video varies according to an adjustment signal transmitted from the brightness/contrast adjuster 18.

As the brightness or the contrast of the video is lowered, the video becomes less bright or sharp, and current fluctuation at the LCD driver 15 that generates the drive signals is suppressed more. As a result, a radiation of electromagnetic waves from the LCD driver 15 (which can become noise to other devices) is also reduced. In this case, the amount of brightness of each pixel of the LCD 16 is also lowered. As a result, the amount of the electromagnetic radiation from the LCD 16 is also reduced.

The signal quality detector 17 utilizes synchronization signals included in the video signal to detect a quality (extend of deterioration) of the video signal. The "quality of signal" indicates an extent to which the signal has been deteriorated by an attenuation of amplitude of the signal, an admixture of noise, or the like. The less the deterioration of the signal becomes, the higher the quality of the signal becomes.

The brightness/contrast adjuster 18 receives the detection result from the signal quality detector 17. The brightness/contrast adjuster 18: generates the adjustment signal based on the detection result. The brightness/contrast adjuster 18 outputs the adjustment signal to the LCD driver 15. The adjustment signal affects the generation of the drive signals by the LCD driver 15.

The controller 19 controls the various processing carried out in the broadcast receiving device 1. The control panel 20 includes various kinds of button switches, a remote control receiver, and so forth. The control panel 20 functions as a user interface for the user to give various instructions to the broadcast receiving device 1. This allows the user to switch the tuned channel, or to designate adjustments to be performed by the brightness/contrast adjuster 18 (whether brightness or contrast is to be changed).

A method with which the signal quality detector 17 detects the quality of the video signal will now be described. First, the signal quality detector 17 checks how many times the synchronization signals included in the video signal (vertical synchronization signals and/or horizontal synchronization signals) have been detected within a specific period of time (such as one second). The detection is accomplished by comparing the pulse of the synchronization signals with a specific slice level. The slice level can be any level for suitably executing the detecting.

Figure 2:
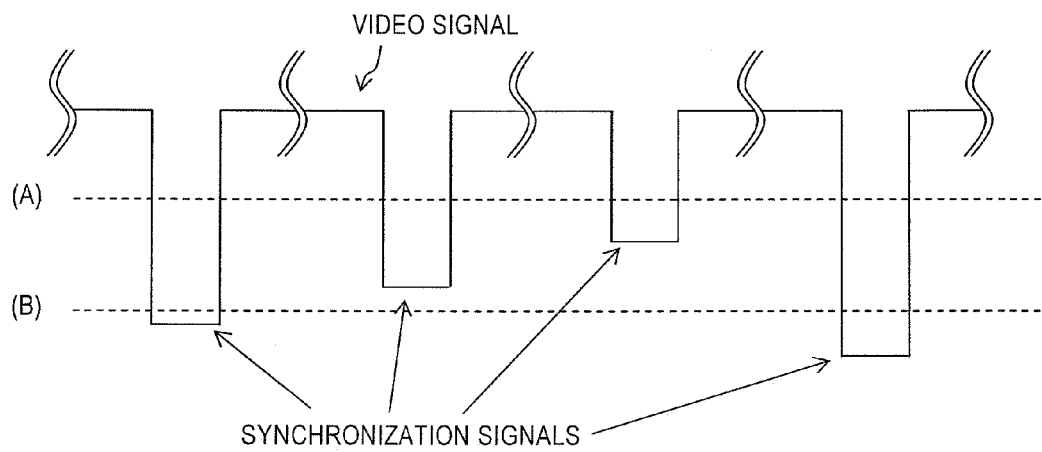
FIG. 2 is a diagram illustrating slice levels used for detecting a synchronization signal.

As shown in FIG. 2, a predetermined slice level A (e.g., second threshold) is normally employed when the synchronization signal is used for the original purpose of synchronizing video. In the detection of the quality of the video signal, a predetermined slice level B (e.g., first threshold) is employed. The slice level B indicates a more stringent condition than the slice level A. As shown in FIG. 2, all four synchronization signals are detected at the slice level A, but only two of the four are detected at the slice level B. That is, when the slice level B is used, the detection of synchronization signals is performed under more stringent conditions than ordinarily. When the video signal deteriorates, the synchronization signals also deteriorates and proper level (depth) of the synchronization signals are not achieved.

Employing the slice levels A and B in this way makes it possible to prevent as much detection leakage of the synchronization signals as possible during normal use, and to prevent the deterioration of video quality. On the other hand, in the detection of video signal quality, the slice level B is employed that is better suited to the detection. Since the slice level B is set as a more stringent condition than the slice level A, the video quality is evaluated more accurately.

A detection ratio of the synchronization signals (synchronization signal detection ratio) is then calculated based on the detection result by the signal quality detector 17. Specifically, the synchronization signal detection ratio is calculated by dividing the total number of the synchronization signals detected with the slice level B by the total number of the synchronization signals detected with the slice level A. The total number of the synchronization signals detected with the slice level A is supposed to be equal to the total number of the synchronization signals that are supposed to have arrived. The synchronization signal detection ratio can also be calculated based on the number of synchronization signals included in the video signal with in a specific period of time since the number of the synchronization signals included in the video signal within the specific period of time is usually known ahead of time. For example, with the vertical synchronization signal, there are 60 synchronization signals per second.

The higher is the synchronization signal detection ratio, the less the video signal deteriorates, and in turn the better is the quality of the video signal. In detecting the quality of the video signal, the total number of the synchronization signals detected within a certain period of time with a predetermined slice level such as the slice level A can be utilized instead of the synchronization signal detection ratio.

Figure 3:
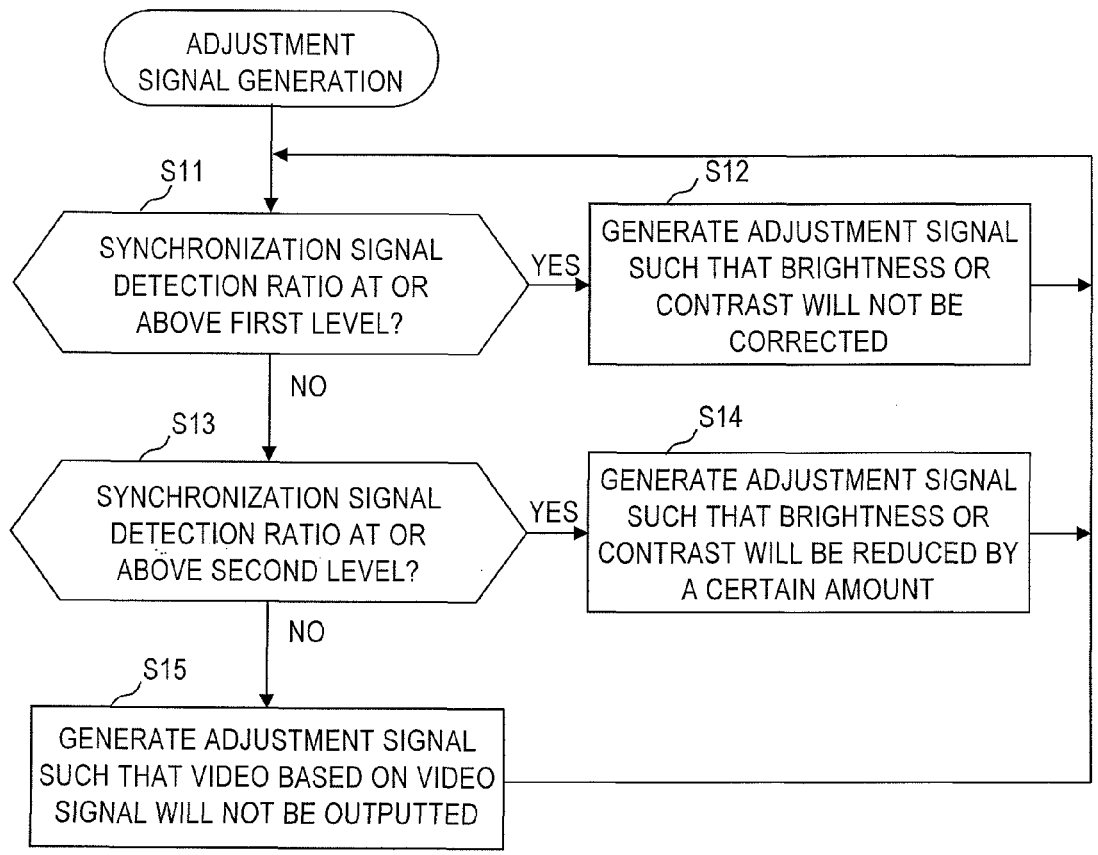
FIG. 3 is a flowchart illustrating an adjustment signal generation processing of the broadcast receiving device.

Next, an adjustment signal generation processing performed by the brightness/contrast adjuster 18 to generate the adjustment signal will be described through reference to the flowchart in FIG. 3. The adjustment signal generation processing is performed during the broadcast receiving device 1 receives the broadcast waves.

The brightness/contrast adjuster 18 monitors the synchronization signal detection ratio obtained from the signal quality detector 17. Then, the brightness/contrast adjuster 18 determines whether or not the synchronization signal detection ratio is at or above a first level (step S11). The first level has been predetermined as a level at which it is assumed that there will be little deterioration of the video signal, and the effect of noise emitted from the LCD driver 15, etc., will be sufficiently low even if video output is performed without any correction processing being performed.

If the brightness/contrast adjuster 18 determines that the synchronization signal detection ratio is at or above the first level (Yes in step S11), then the video signal is in good quality and there is no need to change the video output from the current state. Thus, an adjustment signal is generated so that no particular correction is performed to the brightness or the contrast (step S12). Then, the adjustment signal is outputted to the LCD driver 15.

On the other hand, if the synchronization signal detection ratio is below the first level (No in step S11), then the brightness/contrast adjuster 18 further determines whether or not the synchronization signal detection ratio is at or above a second level (step S13). The second level has been predetermined as a level that is lower than the first level (a level indicating a state of greater deterioration). More specifically, the second level has been set as a level at which the snow noise is generated and there is the possibility that the effect of noise emitted from the LCD driver 15, etc., will pose a problem, but the user can still view the video with some quality.

If the determination result is that the synchronization signal detection ratio is at or above the second level (Yes in step S13), then an adjustment signal is generated such that the brightness and/or the contrast of the video are reduced by a certain amount to reduce the effect of noise emitted from the LCD driver 15 (step S14). Then, the adjustment signal is outputted to the LCD driver 15. The lower the brightness or contrast is set, the less bright or sharp the video is likely to become. The "certain amount" here is set so as to maintain the video at a certain level of quality (enough, for example, not to greatly bother the user).

Therefore, even though the processing of step S14 is carried out, the user can still view the video without being bothered that much. Also, performing the processing of step S14 allows the noise emitted from the LCD driver 15, etc., to be reduced.

If the brightness/contrast adjuster 18 determines in step S13 that the synchronization signal detection ratio is below the second level (No in step S13), then the quality of the video signal is extremely poor. Thus, even if the brightness or the contrast is reduced as discussed above, it will probably be difficult to ensure the video quality. Therefore, in this case, the brightness/contrast adjuster 18 generates an adjustment signal such that the video based on the video signal is not displayed (step S15). Then, the adjustment signal is transmitted to the LCD driver 15.

As a result, noise emitted from the LCD driver 15, etc., can be kept to a minimum. Specifically, when the video based on the video signal is not displayed, a blue background (a previously prepared image in which an entire screen is displayed as blue), for example, can be displayed instead of the video base on the video signal.

With the broadcast receiving device 1, when the synchronization signal detection ratio is at or above the first level (when there is little deterioration of the video signal), the video based on the video signal is outputted without modification (without the brightness or the contrast being adjusted). When the synchronization signal detection ratio is at or above the second level, but below the first level (when there is a moderate amount of video signal deterioration), the video based on the video signal is outputted after the brightness or the contrast of the video has been adjusted. When the synchronization signal detection ratio is below the second level (when there is considerable deterioration of the video signal), the video based on the video signal is not outputted at all.

Thus, with the broadcast receiving device 1, a good balance can be struck between video output and noise reduction, according to the quality of the video signal as estimated from the synchronization signal detection ratio. In this embodiment, the synchronization signal detection ratio is utilized to detect the quality of the video signal, but this is not the only method that can be used to detect the quality of the video signal. Thus, other methods can be used instead. Also, the processing corresponding to comparison with the second level (step S13) can be omitted. Specifically, as long as the synchronization signal detection ratio is below the first level, processing in which the brightness or the contrast is reduced by a certain amount (step S14) can be carried out, for example.

With the broadcast receiving device 1, the receiver 11 receives the broadcast waves. The tuner 12 extracts the video signals pertaining to the broadcasts waves. The LCD driver 15 generates the drive signals for displaying the video on the LCD 16 based on the video signals. The brightness/contrast adjuster 18 compares the quality of the video signals with the first level. The LCD driver 15 generates the drive signal such that the brightness or the contrast of the video is reduced by a certain amount when the quality is below the first level, according to the adjustment signal transmitted from the brightness/contrast adjuster 18.

Therefore, with the broadcast receiving device 1, the drive signal is generated even when the quality of the video signal is below the first level. Accordingly, the video can be displayed on the LCD 16 by the drive signal even if the video signal deteriorates somewhat (even if the quality is below the first level).

In this case, meanwhile, the drive signal is generated such that the brightness or the contrast of the video is reduced by a certain amount. Accordingly, noise emitted from the LCD driver 15 or the like can be kept to a minimum. That is, both video display and noise suppression can be achieved as fully as possible when, due to the extent of deterioration of the video signal, the noise emitted from the LCD driver 15, etc., poses a problem if the video based on the video signal is displayed without modification.

With the broadcast receiving device 1, the brightness/contrast adjuster 18 compares the quality of the video signal with the second level that expresses a lower state than the first level. Then, the LCD driver 15 generates the drive signal such that the generation of the drive signals based on the video signal is halted when the quality is lower than the second level.

When the quality of the video signal is too low, it is difficult to display video of consistent quality even if the brightness or the contrast of the video is lowered enough that noise generation does not cause a problem. Thus, the output of video based on the video signal can be halted by setting the quality of the video signal in a case such as this to the second level.

With the broadcast receiving device 1, the LCD driver 15 generates the drive signal such that previously readied video is displayed on the display when the halting has been performed.

The video indicating that video output based on the video signal has been halted (such as the blue background video) is readied in advance. Thus, when the video output based on the video signal is halted, the user can be notified the current situation and will not bothered as much.

With the broadcast receiving device 1, the signal quality detector 17 detects the synchronization signal detection ratio at which the synchronization signal included in the video signal can be detected. The brightness/contrast adjuster 18 determines the quality based on the detection result.

The greater is the synchronization signal detection ratio at which the synchronization signals can be detected under certain detecting conditions, the less attenuation and noise admixture there will be in the video signal, and this in turn is surmised to result in higher quality. With the broadcast signal, the number of synchronization signals (vertical synchronization signals or horizontal synchronization signals) arriving within a certain period of time is usually predetermined. Thus, it is relatively easy to detect the synchronization signal detection ratio at which synchronization signals can be detected. Therefore, the quality of the video signal can be easily detected.

The present invention can be used in fields such as television broadcast receivers and other such broadcast receiving devices.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A broadcast receiving device comprising:
   a receiving component configured to receive broadcast waves and extract a video signal from the broadcast waves;
   a comparison component configured to calculate a value indicating quality of the video signal as a ratio of a number of synchronization signals detected with a first threshold to a number of synchronization signals included in the video signal, the comparison component being further configured to compare the value indicating quality of the video signal with first and second levels, the second level indicating a lower quality than the first level; and
   a drive signal generating component configured to generate a drive signal for displaying video on a display based on the video signal such that at least one of brightness and contrast of the video is reduced by a certain amount while the value indicating the quality of the video signal is within a first range that is lower than the first level and higher than the second level, the drive signal generating component being further configured to halt the generation of the drive signals based on the video signal while the value indicating the quality of the video signal is within a second range that is lower than the second level.

2. The broadcast receiving device according to claim 1, wherein
   the drive signal generating component is further configured to generate the drive signal such that a predetermined video is displayed on the display when the generation of the drive signals is halted.

3. The broadcast receiving device according to claim 1, wherein
   the drive signal generating component is further configured to generate the drive signal such that the at least one of the brightness and the contrast of the video is reduced by the certain amount when the value indicating the quality of the video signal is lower than the first level and higher than the second level.

4. The broadcast receiving device according to claim 3, wherein
   the comparison component detects the synchronization signals with the first threshold indicating a more stringent condition than a second threshold that is used for detecting the synchronization signals upon synchronizing the video signals.

5. The broadcast receiving device according to claim 4, wherein
   the comparison component calculates the ratio by dividing the number of the synchronization signals detected with the first threshold by the number of the synchronization signals detected with the second threshold.

6. The broadcast receiving device according to claim 4, wherein
   the comparison component calculates the ratio by dividing the number of the synchronization signals detected with the first threshold by the number of the synchronization signals included in the video signal within a specific period of time.

7. A broadcast receiving method comprising:
   receiving broadcast waves;
   extracting a video signal from the broadcast waves;
   calculating a value indicating quality of the video signal as a ratio of a number of synchronization signals detected with a first threshold to a number of synchronization signals included in the video signal;
   comparing the value indicating quality of the video signal first and second levels, the second level indicating a lower quality than the first level;
   generating a drive signal for displaying video based on the video signal such drat at least one of brightness and contrast of the video is reduced by a certain amount upon determining that the value indicating the quality of the video signal is within a first range that is lower than the first level and higher than the second level; and
   halting the generation of the drive signals based on the video signal upon determining that the value indicating the quality of the video signal is within a second range that is lower than the second level.

* * * * *